US012561585B2

(12) United States Patent
Balakrishnan et al.

(10) Patent No.: US 12,561,585 B2
(45) Date of Patent: Feb. 24, 2026

(54) SYSTEMS AND METHODS FOR CLASSIFYING DRIVER BEHAVIOR

(71) Applicant: Cambridge Mobile Telematics Inc., Cambridge, MA (US)

(72) Inventors: Hari Balakrishnan, Belmont, MA (US); Samuel Ross Madden, Newton, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 17/728,060

(22) Filed: Apr. 25, 2022

(65) Prior Publication Data

US 2022/0327406 A1 Oct. 13, 2022

Related U.S. Application Data

(63) Continuation of application No. 16/559,711, filed on Sep. 4, 2019, now Pat. No. 11,315,026.

(Continued)

(51) Int. Cl.
*G06N 5/04* (2023.01)
*G06F 16/28* (2019.01)
(Continued)

(52) U.S. Cl.
CPC ............. *G06N 5/04* (2013.01); *G06F 16/285* (2019.01); *G06F 16/56* (2019.01); *G06N 20/00* (2019.01)

(58) Field of Classification Search
CPC ........................................................ G06N 7/02
See application file for complete search history.

(56) References Cited

U.S. PATENT DOCUMENTS 8,416,067 B2 4/2013 Davidson et al.
8,457,880 B1 6/2013 Malalur et al.
(Continued)

FOREIGN PATENT DOCUMENTS

EP 3744601 B1 4/2024
EP 3507787 B1 8/2024
(Continued)

OTHER PUBLICATIONS

IN Office Action in Indian Appln. No. 202147008865, dated Nov. 18, 2022, 6 pages.
(Continued)

*Primary Examiner* — Van C Mang
(74) *Attorney, Agent, or Firm* — Kilpatrick Townsend & Stockton LLP

(57) ABSTRACT

Data processing techniques and systems for processing telematics data associated with a vehicle, such as an automobile, to classify how the vehicle is being operated by a driver. The telematics data can include the use of image data captured by a camera of the vehicle. The image data is processed in conjunction with vehicular telematics data such as position, speed, and acceleration data of the vehicle obtained from, for example, smartphone sensors. The image data is processed and used by a processing system to provide a context for the telematics data. The image data and the telematics data are classified by the processing system to identify driving behavior of the driver, determine driving maneuvers that have occurred, scoring driving quality of the driver, or a combination of them.

19 Claims, 4 Drawing Sheets

Related U.S. Application Data

(60) Provisional application No. 62/726,916, filed on Sep. 4, 2018.

(51) Int. Cl.
*G06F 16/56* (2019.01)
*G06N 20/00* (2019.01)

(56) References Cited

U.S. PATENT DOCUMENTS

| | | | | |
|---|---|---|---|---|
| 9,842,496 | B1 * | 12/2017 | Hayward | G05D 1/0278 |
| 10,386,192 | B1 | 8/2019 | Konrardy et al. | |
| 10,599,155 | B1 * | 3/2020 | Konrardy | B60W 10/04 |
| 11,315,026 | B2 | 4/2022 | Balakrishnan et al. | |
| 2009/0228172 | A1 | 9/2009 | Markyvech | |
| 2014/0111647 | A1 | 4/2014 | Atsmon et al. | |
| 2015/0053093 | A1 | 2/2015 | Chang | |
| 2015/0178626 | A1 | 6/2015 | Pielot et al. | |
| 2015/0312655 | A1 | 10/2015 | Balakrishnan et al. | |
| 2017/0200061 | A1 * | 7/2017 | Julian | G06V 20/56 |
| 2017/0270615 | A1 | 9/2017 | Fernandes et al. | |
| 2017/0291611 | A1 | 10/2017 | Innes et al. | |
| 2017/0329332 | A1 | 11/2017 | Pilarski | |
| 2018/0040173 | A1 | 2/2018 | Davidson | |
| 2018/0053093 | A1 | 2/2018 | Olabiyi et al. | |
| 2018/0075380 | A1 | 3/2018 | Perl et al. | |
| 2018/0342113 | A1 | 11/2018 | Kislovskiy et al. | |
| 2020/0074326 | A1 | 3/2020 | Balakrishnan et al. | |

FOREIGN PATENT DOCUMENTS

| | | |
|---|---|---|
| EP | 4005252 B1 | 1/2025 |
| EP | 3588373 B1 | 6/2025 |
| JP | 201612675 | 7/2016 |
| JP | 2017-117005 | 6/2017 |
| JP | 201812482 | 8/2018 |

OTHER PUBLICATIONS

BR Office Action in Brazilian Appln. No. BR112021003944-9, dated Jan. 2, 2023, 7 pages (with English translation).

JP Japanese Office Action in Japanese Appln. No. 2021-536674, dated Jan. 4, 2023, 9 pages (with English translation).

EP European Extended Search Report in EP Appl. No. 19857258.8, dated Oct. 7, 2021, 7 pages.

PCT International Preliminary Report on Patentability in International Appl. No. PCT/US2019/049418, dated Mar. 18, 2021, 8 pages.

PCT International Search Report and Written Opinion in International Appl. No. PCT/US2019/049418, dated Nov. 4, 2019, 14 pages.

Royer et al., "Monocular Vision for Mobile Robot Localization and Autonomous Navigation", International Journal of Computer Vision, 2007, 74(3):237-260.

Office Action in Japanese Appln. No. 2021-536674, mailed on Apr. 30, 2024, 6 pages (with English translation).

AU2019337091, "Notice of Acceptance", Mar. 25, 2025, 3 pages.

EP19857258.8, "Summons to Attend Oral Proceedings", Oct. 28, 2025, 30 pages.

* cited by examiner

SYSTEMS AND METHODS FOR CLASSIFYING DRIVER BEHAVIOR

RELATED APPLICATION

This application is a continuation of U.S. patent application Ser. No. 16/559,711, filed on Sep. 4, 2019, which claims priority to U.S. Provisional Patent Application No. 62/726,916, filed on Sep. 4, 2018.

TECHNICAL FIELD

This disclosure generally describes telematics, specifically vehicle telematics.

BACKGROUND

Telematics can refer to the field of sending, receiving, and storing data related to telecommunication devices, global positioning system (GPS) devices, or other such sensors for the purpose of controlling, observing, analyzing, or otherwise interacting with a remote device related to those sensors. In some cases, one or more sensors providing telematics data can be related to a vehicle, such as an automobile. The telematics data provided by the sensors can be used to observe the behavior of the vehicle and the vehicle's driver.

SUMMARY

In an aspect, a data processing system is provided. The data processing system includes a camera configured to capture image data, one or more sensors configured to capture telematics data, and a feature classification engine configured to generate classification metrics for a feature vector by performing one or more operations. The one or more operations include generating, based at least partly on the image data and telematics data, the feature vector, with the feature vector comprising features representing events of interest of the image data and the telematics data. The one or more operations include determining, using machine learning logic, a classification metric for each feature of the feature vector. The data processing system includes a prediction engine configured to generate a prediction value indicative of a predicted likelihood of one of the events of interest occurring by performing one or more operations. The one or more operations include assigning to each feature, based at least partly on the classification metric of the respective feature, a prediction weight. The one or more operations include determining the prediction value based at least partly on prediction weights for remaining features of the feature vector.

The event of interest can include one or more of: a relative speeding event, a following distance event, a traffic density event, a rolling event, a missed stop event, a turning behavior event, a hard stop event, an impaired visibility event, or a crosswalk behavior event. The features can include one or more of: a street light, a vehicle, a street sign, a road marking, a pedestrian, a bicyclist, or an animal. The telematics data can include one or more of: acceleration data, position data, and wireless signal strength data. The image data can include one or more of: an image or a series of images, or a video.

The prediction engine can be configured to generate a risk score that is associated with a driver based at least partly on the prediction value. The prediction engine and the feature classification engine can be part of a mobile device. The prediction engine and the feature classification engine can be part of a vehicle device. The prediction engine and the feature classification engine can also be a part of a remote computing service that the vehicle or mobile device communicates with.

These and other aspects, features, and implementations can be expressed as methods, apparatus, systems, components, program products, methods of doing business, means or steps for performing a function, and in other ways, and will become apparent from the following descriptions, including the claims Implementations of the methods and systems described in this specification include one or more of the following advantages. As opposed to traditional techniques for assessing driver behavior using telematics data, image data (e.g., video data) is processed and classified to provide a context for captured telematics data for assessing driver behavior. For example, position, velocity, and acceleration data from smartphone sensors, in-vehicle sensors, and after-market telematics devices provide telematics data that the processing system described in this specification classifies to score driving quality. A higher score, for example, may correspond to a safer and/or less risky driving behavior (for example, relative to a lower score indicating increased risk in driving behavior). Driver behavior is classified and scored based on factors such as phone distraction, excessive speeding (for example, 15 miles per hour over a listed speed limit), hard or severe stopping (e.g., braking) events (for example, causing the velocity of the vehicle to decrease 7 miles per hour within 1 second, causing the velocity of the vehicle to decrease by 20 miles per hour within 1 second, and so forth), harsh acceleration (for example, causing the vehicle to increase in velocity by 8 miles per hour within a second) or cornering, mileage driven, the durations of drives, the times-of-day of drives, etc. Such driver actions are identified from the telematics data and labeled as risky behaviors which may negatively impact the score of a driver. To increase the accuracy, when compared with traditional techniques, of labeling the telematics data, the telematics data (for example, position data, velocity data, acceleration data, and so forth) is processed and classified with the image data. The data processing system uses the additional context from the image data to classify the telematics data as indicative of risky driver behavior with increased confidence by, for example, subsequently determining whether the telematics data indicating a risky behavior should negatively affect a driver score and/or by how much. The image data can provide a context to the telematics data to determine whether the driver is taking inappropriate risks while driving or whether the driver is responding to an environment in an appropriate manner. For example, a driver may need to suddenly brake because the driver was following another vehicle too closely, but the driver may also need to suddenly brake to avoid another driver ignoring a stop sign. The image data can provide the context necessary to determine whether the driver is at fault, partial fault, or whether the driver was driving appropriately.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
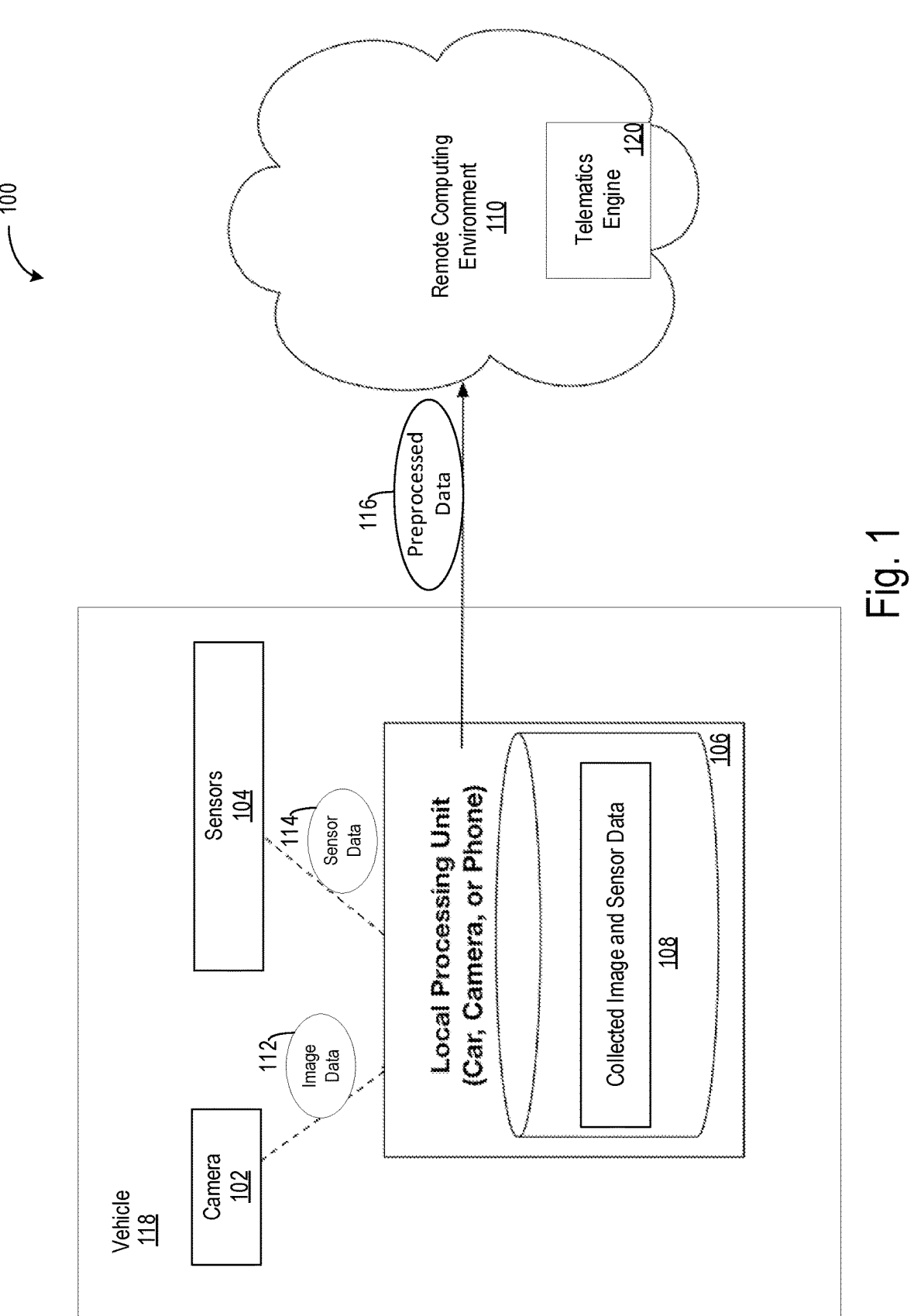
FIG. 1 shows an example system for processing data to contextually classify driver behavior.

This disclosure describes data processing techniques and systems for processing telematics data associated with a vehicle, such as an automobile, to classify how the vehicle is being operated by a driver. Image data is processed in conjunction with the telematics data (for example, position data, speed data, acceleration data, and so forth) obtained from sensors (for example, smartphone sensors, an embedded telematics device, or sensors of similar devices in the vehicle, and so forth). The image data (for example, video data) is processed and used by a processing system to provide a context for the telematics data. The image data and the telematics data are classified by the processing system to identify driving behavior of the driver, determine driving maneuvers that have occurred, scoring driving quality of the driver, or a combination of them.

One example application of identifying and classifying the behavior of a driver can be for risk assessment for automotive insurance policies, where drivers with more risky maneuvers have been shown to be at greater risk for crashes. The systems and processes described in this specification determine a driving score for drivers for predicting the risk of a crash. For example, a score for a driver can indicate a probability of that driver being involved in a crash. The score, generated by the systems and methods described in this specification, can also be useful for a number of other applications, such as setting insurance premiums, providing discounts and rewards for safe driving, running safe-driving contexts, and providing feedback and insights to drivers so they can improve their driving.

The systems and methods described in this specification are configured for collecting, processing, and storing image (for example, video) data for use in classifying driver behavior. The systems and methods described in this specification overcome the challenges of, among others, collecting, processing, storing, and transmitting the amounts of data required for providing image context to telematics data. The system can be configured to process the video data locally to the vehicle to reduce bandwidth requirements for transmitting video data to a remote computing environment (for example, a cloud computing environment). This enables the system to analyze the image data for context because sending all captured image data to servers via wireless networks can, in some cases, consume significant network bandwidth and storage on phones. The systems and methods described in this specification can reduce an amount of computer processing required in prior systems and techniques to reduce the power required for providing context to telematics data. For example, reducing the computing power required can reduce the drain on batteries of a mobile device that may be processing the data and thus enable longer operating times for the device.

This specification describes a variety of contextual behaviors that, as opposed to prior systems and techniques, can be newly identified from image data. This specification describes systems and methods for inferring context from the image data, attributing risk to the contextual behaviors, or both.

FIG. 1 shows an example system 100 for processing data to contextually classify driver behavior. The system 100 includes a camera 102 configured to capture image data 112. The image data 112 can represent individual images for data processing, video, a burst series of images, and so forth. The system 100 includes one or more sensors 104 that gather sensor data 114 (for example, telematics data). The sensors 104 include one or more of accelerometers, positioning sensors (e.g., GPS sensors), ranging sensors, acoustic sensors, ultraviolet (UV) detection sensors, infrared sensors, and so forth. Taken together, the sensor data 114 and the image data 112 can be combined to generate collective data 108. The vehicle 118 includes an on-board (local) computing system (for example, processing unit) 106 for storage and processing of the collective data 108. Once the local computing system 106 has processed the collective data 108 (as described below), pre-processed collective data 116 is transmitted to a remote computing environment 110 (for example, a cloud computing environment). The vehicle 118 can include any transportation device that is navigating, typically being driven by an operator in the vehicle. The vehicle 118 can include a car, truck, van, etc.

Figure 3:
FIG. 3 shows example image data.
Figure 3:
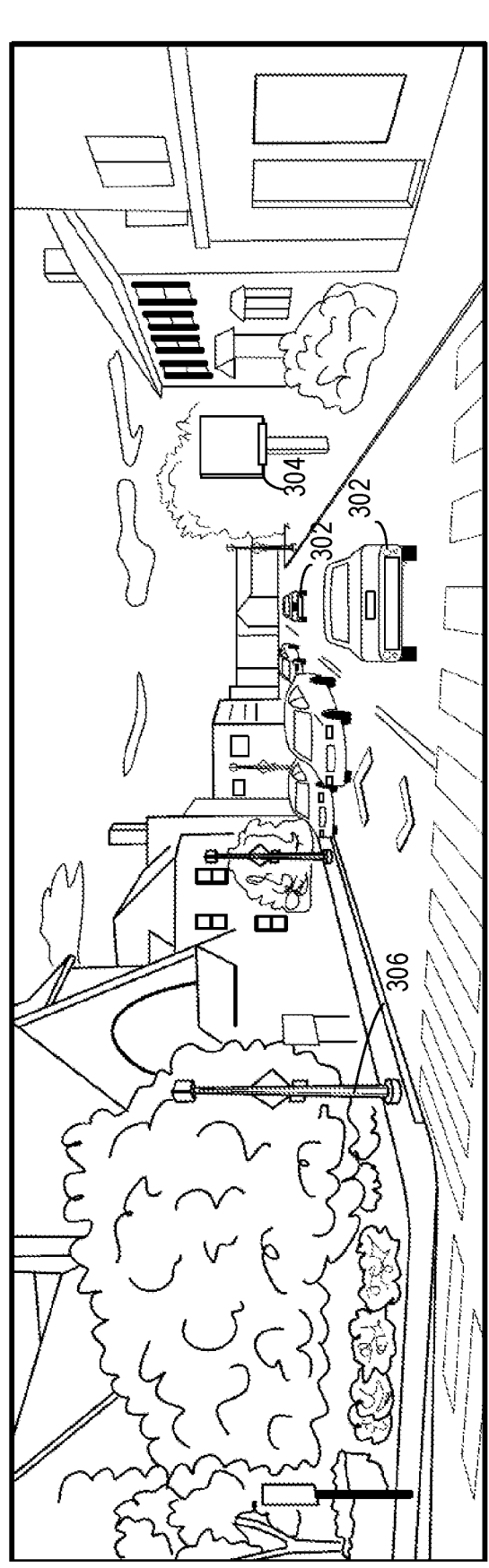

The camera 102 can be configured to capture image data 112 of an environment around the vehicle 118 (see, for example, FIG. 3). The camera 102 can be mounted anywhere on or in the vehicle 118 to capture image data 112 of the environment around the vehicle, such as image data that can be germane to providing context to the sensor data 114 gathered by the sensors 104. For example, the camera 102 can face a longitudinal direction relative to the vehicle's 118 movement (e.g., a forward-facing dashboard camera or a rear-facing camera) to capture the scene as viewed by the driver of the vehicle 118. The camera 102 can be equipped with a wide-angle lens to accommodate a viewing angle similar to that of the driver (e.g., about 130 degrees). Any optical distortion of the image caused by a lens can be corrected by image processing. In some implementations, the camera does not include a wide-angle lens, and no distortion correction is performed. In some implementations, the camera 102 is a part of the vehicle 118. In some implementations, the camera 102 is a part of a mobile computing device such as a mobile phone, dashboard camera, and so forth. Although the shown implementation shows only one camera 102, implementations are not so limited. In some implementations, the system 100 includes more than one camera 102. For example, the system can include four cameras 102, two facing in both longitudinal directions relative to the movement of the vehicle 118 and two facing in both lateral directions relative to the movement of the vehicle 118.

The sensors 104 include, as described above, any sensor which can provide telematics data 114 to the computing system 106 of the vehicle 118. The sensors 104 can be mounted on the vehicle 118 itself (e.g., be a part of the vehicle computing system, not shown). In some implementations, the sensors 104 are a part of a mobile computing device (for example, a smartphone) that is not a part of the local vehicle computing system 106. In such cases, the mobile computing device is interfaced with the vehicle's operating system by one or more communication protocols. For example, the mobile computing device may communicate with the vehicle 118 using protocols such as Bluetooth, TCP/IP, Zigbee or other such IEEE 802.15.4 communication protocols, and hardwire communication (e.g., via Universal Serial Bus (USB) or IEEE 1394 Firewire protocols, etc.).

The sensors available on a mobile computing device that can be useful in capturing telematics data 114 include, but are not limited to, position sensors (e.g., the Global Positioning System, GPS), a three-axis accelerometer to measure the phone's acceleration along three orthogonal axes, and a three-axis gyroscope to measure the phone's angular velocity along the three axes.

We use the term "mobile device" to include, for example, any kind of equipment that can be carried by a user without requiring wired connection to a communication link and is subject to being used, while a user is driving, in a way that can cause distraction of the user from the driving. In some implementations, mobile devices include mobile phones and wearable devices (e.g., smart watches), but can also include tablets, laptops, etc.

The local computing system 106 of the vehicle 118 is described later in further detail with respect to FIG. 4. The local computing system 106 includes one or more processing units for processing the collective data 108. The local computing system 106 includes a storage for storing the collective data 108 and any other data required for processing the collective data 108. The local computing system 106 can be integrated with the camera 102, the sensors 104, a mobile device, an on-board computing device of the vehicle 118, or a combination of them, among others. In some implementations, the local computing system 106 is a part of the vehicle itself, and can control other vehicle functions. In some implementations, the local computing system 106 is a part of a mobile device (e.g., the mobile computing device that includes one or more of sensors 104 and/or camera 102).

The remote computing environment 110 includes one or more networked processing devices that are configured to send and receive data from the local computing system 106. The remote computing environment 110 can include a cloud computing environment for cloud processing. The remote computing environment 110 receives data such as pre-processed telematics data 116 from the computing system 106 and performs additional computations for determining a risk score for the driver of the vehicle 118. For example, the remote computing environment 110 may perform machine learning classification operations on the pre-processed telematics data 116 to classify the data as showing an amount of risk (for example, a weighted value of risk) and subsequently generate a score for the driver, adjust a score for the driver, or both. Thus, at a high level, the system 100 can be used to capture sensor data 114 (telematics data 114) and image data 112, and determine a contextualized risk score based at least partly on the captured data.

In some implementations, a user (for example, a driver of the vehicle 118) installs a mobile application (app) on a mobile phone and drives with the mobile device in the vehicle 118 (for example, affixed to a portion of the vehicle 118). The application can be executed in a background state, automatically detecting the start and stop of each trip of the vehicle 118 using information from location and mobile phone activity application programming interfaces (APIs) (for example, provided by the device's operating system). In some implementations, the location data is augmented with information from the inertial sensors on the phone. In some implementations, wireless signals from an in-vehicle device such as a tag device can be used, such as described in U.S. Patent Application Pub. No. 2015/0312655, incorporated herein in entirety by reference.

The local computing system 106 is capable of receiving the sensor data 114 from the sensors 104 when the user (of the phone) is driving. This sensor data 114 is analyzed and initially processed by the local computing system 106 (which, in some implementations, is integrated with the mobile phone). The sensor data 114 is transmitted to the remote computing environment 110 (such as a cloud computing environment) through a wireless network (for example, Wi-Fi, cellular, or any other network providing connectivity to the servers). At the remote computing environment 110, a telematics engine 120 processes the preprocessed data 116 from the local computing system 106 to accurately estimate both the dynamics of the vehicle and the movement patterns of the mobile phone within the vehicle. In some implementations, such computations are run on the local computing system 106 itself without the data being sent to the remote computing environment 110.

Data from the sensors 104 is contextualized with image data 112 to provide adequate context for the types of "risk" events that are identified from the sensor data 114. For example, a braking event due to an animal jumping in front of the vehicle 118 may be associated with less risky driving behavior than a braking event caused because a driver that was distracted by their phone and, as a result, failing to see a traffic light turn red. A hard braking event caused by a driver not anticipating a pedestrian or bicyclist may be determined to be more riskier behavior that a hard braking event at a stop sign on an empty street.

Providing such a context from the image data 112 overcomes several shortcomings for driver behavior measurement systems without the image data 112. For example, the system 100 is capable of identifying events that are unavoidable, and therefore not being substantially caused by risky driving behavior exhibited by the driver. For example, in the case of a hard or severe braking event in response to the presence of an animal, or flagging a user for speeding in a setting where the prevailing speeds of other cars are well above posted speed limits may not be considered risky behaviors.

Additionally, the system 100 can identify risky situations that are not visible as excessive acceleration or speeding events. For example, behaviors such as frequently passing on two-lane roads, driving in snow, or rolling through stop signs can be identified from the image data 112.

Such analysis by the system 100 can enhance the system's 100 ability to properly measure risk and provide more accurate risk assessments to consumers of driver safety data, such as insurance applications. In addition, the experience for drivers using risk assessment technology is improved, as drivers may often feel they are unfairly penalized for unavoidable maneuvers that are marked as risky due a lack of context for the sensor data 114.

As described in further detail below, augmenting telematics data with image data from in-vehicle cameras can provide a way to infer this contextual information. Using computer vision algorithms, numerous objects and features encountered while driving can be recognized and labeled to provide contextual information for better driver quality scoring. Moreover, the captured image data can help with user engagement and feedback. For example, providing video segments to users exhibiting behaviors that lower their score can help them recall, understand, and avoid risky maneuvers.

As previously described with reference to FIG. 1, the image data 112 from the camera 102 is combined with other sensor data 114 (for example, telematics data) from the sensors 104, (for example, on mobile devices, in-vehicle electronic components, after-market devices, or a combination of them) and preprocessed by the local computing system 106 (which can be integrated with a mobile device, a dedicated telematics device, on-board computing systems, the camera 102, or a combination of them) to identify contextually relevant events from the image data 112, or to filter portions of the image data 112 that include events of interest. Certain elements of the preprocessed data 116 are then transmitted to the remote computing environment 110 for further refinement and processing. A variety of implementations are possible. In some implementations, all processing and capturing of the image data 112 is performed by the camera 102. In some implementations, all processing and capturing of the sensor data 114 is performed by the sensors 104. In some implementations, the local computing system 106 of the vehicle 118 is capable of performing all processing of the image data 112 and the sensor data 114 without the use of the remote computing environment 110.

Some examples of specific driving behaviors and contextual information that are identifiable from the image data 112 captured by the camera 102 include one or more of the following: relative speeding (for example, whether a driver is traveling faster or slower than other cars on the road or posted speed limits); following distance of the vehicle relative to other vehicles on the road (for example, tailgating); traffic density (for example, whether the vehicle 118 is being operated in stop and go traffic or a measure of the number of other vehicles in close proximity to the vehicle 118); identifying missed stops at stop signs or stop lights (for example, when the vehicle 118 fails to come to a complete stop before advancing through a designated stop sign or a red light at a stop light); harsh accelerations through yellow lights (for example, when the vehicle 118 accelerates when encountering a yellow light at a stop light); turning behavior (for example, identifying when a left turn signal of the vehicle 118 is not activated before making a left turn in right-side drive countries or when a vehicle 118 makes a left turn at a stop light before the stop light activates a left turn signal that indicates when the vehicle 118 should make a left turn); contextualized hard braking events (for example, recognizing whether a hard braking event was due to the sudden appearance of a person, animal, or other vehicle); weather conditions (for example, determining whether the visibility of the driver of the vehicle 118 is impaired because the vehicle 118 is being operated in snow, rain, or foggy); ambient lighting conditions; whether the driver failed to stop or slow down for crossing pedestrians or bicyclists; and whether the vehicle 118 is operating too close to pedestrians or other vehicles.

The system 100 can use one or more methods to infer the above elements from image, acceleration, speed and position data, as described later in further detail. The system 100 can use an object and bounding box detection and recognition module (sometimes referred to as an object detector) for processing image frames, such as Yolo or SSD. This object detector is capable of identifying objects such as cars, people, bicycles, and traffic signs/lights, and provide an approximate bounding box around each detected object. Further, the ability of the object detector to approximately position the object in 3D is assumed, given that the camera 102 is at a known and fixed orientation in the vehicle 118, as described in Eric Royer, Maxime Lhuillier, Michel Dhome, Jean-Marc Lavest, Monocular Vision for Mobile Robot Localization and Autonomous Navigation, International Journal of Computer Vision, Springer Verlag, 2007, 74 (3), pp. 237-260, which is incorporated herein in entirety by reference. The object detector is capable of producing a sequence of object detections of the form:

object class, time, x position, y position, width, height

Where x position refers to a distance (for example, in meters) to the left (negative) or right (positive) of the camera 102, and y position is a distance in front of the camera 102.

Furthermore, given a detection, object tracking methods based either on machine learning (for example, GOTURN), optical flow, or other visual coherence methods, can be used to follow an object over time, can be used, given an object of class C detected at time t1, determine if a later detection of an object class C at time t2 is the same object.

In addition, an estimate of the speed, position, and heading of the vehicle 118 including the camera 102 is assumed to be available at a regular sample rate (for example, once per second). This can be obtained using the sensors 114.

Methods that the system 100 can use for extracting the eight contextual behaviors previously described will now be explained.

Relative Speeding

Relative speeding is defined as whether the vehicle 118 is moving at or substantially above or below the prevailing speed of other vehicles in the environment proximate to the vehicle 118. It can be presumed risky to drive much faster or slower than other vehicles. The method for determining contextual speeding can include estimating the speed of each object by measuring its change in relative distance from the camera 102 over time. Given an object O at Y position D1 at time T1, which is later at Y position D2 at time T2, the speed of O relative to the vehicle 118 can be defined as (D2−D1)/(T2−T1).

The relative speed score of the vehicle 118 over a time window W[Ta,Tb], between times Ta and Tb, is defined using the method below. Simply averaging all of the relative speeds of other vehicles observed during the time window may overweight the contribution of some vehicles which are moving too fast or too slow. Therefore, method to count the fraction of other vehicles which are moving significantly faster or slower than the vehicle 118 may be desirable. The approach can be described in pseudocode according to the following:

```
Initialize Count = 0, ThreshCount = 0
Given a set of all vehicles V detected more than once during W,
For each distinct v in V, detected first at time Tv1 in W and last at time
Tv2 in W, with corresponding "y-axis" positions Dv1 and Dv2 (the origin
of the y axis is the location of the observing vehicle)
  Let Sv = (Dv2 − Dv1) / (Tv2 − Tv1)
  Let Count = Count + 1
  If Sv > speedThresh:
    ThreshCount = ThreshCount + 1
  If Sv < −speedThresh:
    ThreshCount = ThreshCount −1
Relative Speed Score = ThreshCount / Count
```

Thus, the relative speed score can be a number between −1 and 1 indicating what fraction of other vehicles are moving significantly slower or faster than the vehicle 118 over a particular time period. Particular uses of this metric to assess overall driver risk is described later in further detail.

Following Distance

Following other vehicles too closely, particularly on a freeway, can be presumed as a risky behavior. Following distance can be computed in a method similar to relative speeding. For example, the Following Distance Metric can be a number between 0 and 1 indicating what fraction of time during a window when the vehicle 118 was being operated near another vehicle within some threshold distance of that vehicle (for example, less than 10 feet behind another vehicle).

For each vehicle detection, if the detected vehicle is approximately directly in front of the driver (i.e., the x position is in the range [threshX, +threshX], for some small value of threshX), the detection is added to a detection bin [detectedSet]. Then for a time window W [Ta,Tb], the fraction of time the following distance was less than some threshold [threshY] is produced as shown using the following pseudocode:

```
Initialize closeCount = 0, Count = 0
Given a set of all vehicles in detectedSet detected during Window W =
[T1, T2]
For each v in detectedSet, let d = v.yPosition, i.e., the distance to the
vehicle:
    If d < threshX:
        Let closeCount = closeCount + 1
    Let Count = Count + 1
FollowingDistanceMetric = closeCount / Count
```

Particular uses of this metric to assess overall driver risk is described later in further detail.

Traffic Density

Driving in areas of high traffic density can increase the likelihood of crashes, as "stop-and-go" situations can be risk-prone. In some implementations, traffic density is estimated by measuring the number of other vehicles proximate to the vehicle 118 in a given time window. However, to avoid measuring other vehicles traveling in the opposite direction relative to the vehicle 118, the image data 112 and sensor data 114 can be used to measure the number of other vehicles traveling in the same direction as the vehicle 118. For example, other vehicles traveling in the same direction relative to the vehicle 118 can be measured by identifying other vehicles detected more than once in a time window in the image data 112. This exploits the fact that, in many instances, other vehicles traveling the opposite direction relative to the vehicle 118 are unlikely to be visible for more than a few image frames. If a particular other vehicle is present in more frames than a threshold number of frames (for example, either a dynamic or static threshold) then that particular other vehicle can be identified as traveling in the same direction. The threshold can be dynamically set depending on environmental factors, such as the speed of the vehicle 118 and a location of the vehicle 118. For example, if the vehicle 119 is not moving (for example, parked), then the traffic density metric can be ignored. However, if the vehicle 118 is not moving, but in a segment of a roadway designated for movement, it can be determined that the vehicle 118 is stopped at a red light (for example, a system 100 can determine, based on the image data 112, that the vehicle 118 is in a static position due to a red light), or it can be determined that the vehicle 118 is in a "stop and go" traffic event. Using the following measure:

densityRisk=number of other vehicles V detected
more than once during time window;

a "traffic density risk score" can be used to assess overall driver risk. Examples of using this metric to assess overall driver risk is described in further detail below.

Rolling Stops/Running Yellow Lights

Rolling through stop signs (for example, when the vehicle 118 does not come to a complete stop before progressing through a stop sign) and accelerating through yellow/red lights can both be considered risky maneuvers that can be detected from the image data 112. When the vehicle 118 progresses through a stop sign or stop light, the system 100 can determine whether the vehicle 118 failed to slow down or stop before progressing through it. For example, the system 100 can identify a stop sign or red light using the image data 112, and then determine whether the vehicle 118 came to a complete stop within a few seconds of observing the sign or light. In some instances, a stop sign or may be detected by the system 100, but it may not be in the direction of travel of the vehicle 118. In such instances, system 100 can ignore the stop sign or light. Such a determination can be made based on other data (such as based on the placement/orientation of the camera 102 on/in the vehicle 118, the position of the sign/light in subsequent frames of the image data 112, the position of the vehicle 118, and so forth).

Given a time window, this system 100 can measure a number of instances in which the vehicle 118 failed to come to a complete stop for a stop sign or red light. For each instance, the system 100 can determine one or more of the following: the location of the failure, whether the failure corresponded to a red/yellow stop light or stop sign, and the speed distribution during the failure (including the minimum speed). The system 100 can use this data to assign a risk score to each instance, as described later in more detail. In some implementations, when the vehicle 118 progresses through a yellow light, the system 100 determines the distance the vehicle 118 was from the yellow light. For example, if a light is yellow for a number of frames below a threshold number of frames, the system 100 can determine that there was a relatively small risk (or no risk) associated with progressing through the yellow light, because, for instance, causing 118 the vehicle to suddenly come to a stop might be riskier behavior, such as if a another vehicle is trailing the vehicle 118 and the driver of the trailing vehicle is not expecting the vehicle 118 to come to a stop.

Turning Behavior

In some instances, turn the vehicle 118 can be considered risky, and left-hand turns (in right-side drive countries) against oncoming traffic can be especially dangerous. Using the image data 112, the system 100 can identify when a left hand turn is "unprotected" (for example when a traffic light does not exhibit a left-turn arrow specifically allowing the turn, and when there is oncoming traffic such that the vehicle 118 must cross the oncoming traffic to complete the turn).

Given a time window W of the sensor data 114, including location and heading information, as well as the image data 112, the system 100 can identify left turns in heading information, as periods of <K seconds with a greater than D degrees of heading change in a counter-clockwise (leftwards) direction, where K and D are configurable thresholds, typically 30 seconds and 60 degrees. For each turn, the system 100 can extract the image data 112 from P seconds before the start of the turn, up to and including the K seconds after the turn.

For each turn, the system 100 can use the image data 112 to identify 1) whether there was a green left turn arrow in any of the image frames of the image data 112, and/or 2) the speed and number of other oncoming vehicles observed during the turn. For determining if a particular other vehicle is an oncoming vehicle, the system 100 can identify consecutive observations of the same other vehicle, and determine if that particular other vehicle's relative location (for example, y distance) is decreasing over time. Because left turns may take several seconds to fully execute, most oncoming other vehicles will be observed in a number of image frames (unlike in the traffic density case where most oncoming vehicles will quickly move out of frame). For a given window, the risk turn metric measures the number of left turns with more than V oncoming vehicles, where V is a configurable threshold (such as 2). Further details on how this metric can be used to assess overall driver risk is described later.

Contextualized Hard Stops

Hard or Severe braking events because of an unforeseeable event, such as animal suddenly appearing in the path of the vehicle 118, may not necessarily be predictive of a driver's future risk. For this reason, it can be beneficial to assign different levels of risk to different hard or severe braking events based on context inferable from the image data.

For each hard braking event detected by the system 100 from the sensor data 114 (where a hard braking event may defined as deceleration above some threshold for some amount of time, such as 7 miles per hour within 1 second), the system 100 can perform operations including the following:

---

Extract the video data VD in the C seconds before the event (e.g., C = 2
  seconds).
  Let detectedObjects = all objects v in VD where v.y distance < T1
meters and |v.x distance| < T2 meters (where T1 and T2 are configurable
thresholds, e.g., 5 meters and 2 meters).
  Let context stop metric = riskFunction(detectedObjects, event
  magnitude).

---

The riskFunction can allow different levels of risk to be assigned to different types of objects. For example, dogs and deer, which can move relatively quickly when compared with other animals, may be assigned a low risk level because drivers may not necessarily foresee them. On the other hand, pedestrians and bikes, which move more predictably than dogs or deer, but can still enter the roadway unpredictably, may be assigned a moderate risk level, and all other objects (or no objects) may be assigned the highest level of risk. Further details on how this metric can be used to assess overall driver risk is described below.

Impaired Visibility

Severe weather can often impair visibility, increasing driving risk. The image date 112 captured by the camera 102 can be used to measure visibility. For example, the system 100 can assess the overall distortion indicated by the image data 112, evaluate the overall the brightness and lighting (taking into account variations caused by, for example, the camera's 102 aperture), or both. In some implementations, to attribute risk when the driver of the vehicle 102 cannot fully observe objects, the system 100 can measure the ratio between the maximum y-distance of a detected vehicle (or object) in a time window W versus the kth percentile of the y-distance of all detected vehicles (or objects) over all time (where k is a configurable parameter, which is 95 in some implementations). In some implementations, the system 100 performs operations according to the following:

---

Let maxHistoricalY = kth percentile of y-distance all vehicle detections
Let windowMax = 0
For a given time Window W = [T1, T2], let V = all vehicle detections in
[T1, T2]
  For each v in V, if v.y distance < windowMax, let windowMax = v.y
distance
Let visibility metric = 0
If windowMax > 0 and windowMax / maxHistoricalY < visThresh,
  Let visibiltiy metric = log(1/ windowMax / maxHistoricalY)
Where visThresh is a configurable parameter, < 1, typically 0.9

---

Accordingly, in some instances, the visibility metric is inversely proportional to the largest distance detected for a vehicle in the time window. Further details on how this metric can be used to score a driver's risk due to impaired visibility is described later.

Crosswalk Behavior

Drivers who do not stop their vehicles for pedestrians in crosswalks may risk causing pedestrian injuries. In addition, a failure to stop at a pedestrian-occupied crosswalk may also be a sign of driver distraction (because the driver isn't driving attentively), or impatience, which itself may be correlated with risky driving behavior. In some implementations, the system 100 detects this behavior according to the following.

In a given Window W=[T1, T2],
  Let P=each pedestrian object p that is detected, where there is also a crosswalk object present; they distance of the pedestrian and crosswalk are within D meters of each other; where D is a configurable threshold, typically 1 meter; the detected bounding box of the pedestrian overlaps the detected bounding box of the crosswalk, indicating the pedestrian is in the crosswalk; they distance to P is <Dcross; where DCross is a configurable parameter indicating the driver is near the crosswalk, typically 10 meters; and where DCross may depend on the speed of the vehicle;

Ped Metric=0;

For each p of P, let slowed be a binary variable that indicates if the vehicle did not slow down to some speed<SCross, where SCross is a configurable parameter, typically 5 m/s, indicating that the vehicle slowed when approaching the crosswalk;

Ped Metric=Ped Metric+slowed.

Thus, the pedestrian metric can be a measure of the number of pedestrian-occupied crosswalks for which the vehicle 118 failed to slow. Further details as to how the pedestrian metric used to score for a driver's crosswalk-related risk is described later.

Attributing Risk to Behaviors

The system 100 generates, for each driver, a vector of risk scores, indicating their degree of exposure to certain risky behaviors. For example, a risk vector can be one or more of the following: distraction-risk, braking-risk, and relative-speeding-risk.

Given a collection of such risk vectors for different drivers as historical accident frequency data for those drivers, a model (e.g., a generalized linear model, or GLM) can then be fit to the data to predict the crash or claims frequency from the risk variables. In some implementations, a machine learning engine 300 (for example, as described later in relation to FIG. 4) can be used to classify/identify events to calculate a risk score.

1. Relative Speeding

The system 100 is capable of determining one or more relative speeding scores. For example, the system 100 can computer a slow score, which is determined relative to the frequency with which the driver drives the vehicle 118 below the prevailing speed, and a fast score, relative to the frequency the driver drives the vehicle 118 above the prevailing speed.

The system 100 is capable of identifying road segments where relative speeding behavior is determined to be most relevant (for example, highway segments where drivers should generally travel at or around the prevailing speed limit). Identifying such road segments can include matching the vehicle's 118 trajectory to an underlying road map (for example, as described in U.S. Pat. No. 8,457,880, which incorporated in entirety by reference herein), where segments on the road map are labelled with their class (e.g., freeway, surface street, etc.). The system 100 is capable of determining the time periods in which the vehicle 118 was traversing a consecutive set of such segments, and determining a relative speeding metric M for each such time period (using the definition of relative speeding above, for example, a number between −1 and 1). One such metric can be produced for each interval of T minutes or less that the vehicle 118 was being operated, such that, for example, if T was 5 minutes, and the vehicle 118 traversed a sequence of highway segments for 20 minutes, the system 100 can produce 4 metrics. For each metric M, if |M|>threshold (for example, 0.25), and if M is positive, the system 100 can increment the driver's fast score. Conversely, if M is negative, the system 100 can increment the driver's slow score. The driver's slow and fast relative speed risk accumulate the more frequently the user engages in slow/fast driving. In some implementations, the system 100 does not normalize for the total amount of driving, or the time number of times the driver operated the vehicle 118 on a particular road.

2. Following Distance

Computing a risk score for following distance can include identifying periods when the vehicle 118 was operating on segments in which closely "tailgating" other vehicles is more risky (for example, freeway segments) than other segments (for example, residential roads), and then accumulating a "following risk score" based on the total amount of time spent tailgating. Given a set of time periods when the vehicle 118 was traversing a highway road segment (which, as previously described, can be inferred via map matching), the system 100 is capable of dividing those time periods into windows of at most T minutes, and determining the following distance metric for each window. The system 100 is capable of incrementing the overall following score by 1 for each such window when the following distance metric is above some threshold (for example, 0.25). In this way, the system 100 cab accumulate following-distance risk metrics as the driver operates the vehicle 118 closely to other vehicle's (for example, tailgating) over time.

3. Traffic Density

The system 100 can determine the risk score for traffic density by dividing all of a driver's driving time into intervals of length T or shorter (in some implementations, the value of T is 5 minutes), and measuring the number of such intervals when the density metric exceeds D vehicles. The value D can be selected based on the resolution of the camera 102 in use and the object detector, as there may be considerable variability with respect to the number of pixels a particular other vehicle must occupy to be identified by different object detectors.

4. Missed Stops (Rolling/Failed Stops)

The system 100 can determine the risk score for failed/rolling stops by measuring a number of missed stops during a scoring period (for example, two weeks). In some implementations, some missed stops may be weighted higher than others. For example, if the vehicle 118 is progressing through a stop sign faster than a certain speed (for example 15 miles per hour) through a stop sign, that missed stop can be weighted more highly than instances in which the vehicle 118 progresses through yellow lights or slowly progresses (for example, 2 miles per hour) through a stop sign.

5. Turning Behavior

The system 100 can determine the risk score for unsafe turns by summing all of the calculated turn metrics determined for the driver.

6. Contextualized Hard Stops

The system 100 can determine contextualized hard stop risk as the sum of the contextualized hard stop metric over all hard braking events. In some implementations, this contextualized risk metric may be used in place of the non-image enhanced braking risk, or in conjunction with it.

7. Impaired Visibility

The system 100 can determine the total risk score for visibility by dividing driving time into windows of T minutes, and then summing the visibility metric over all such windows.

8. Crosswalk Behavior

The system 100 can determine a total risk score for crosswalk behavior by summing the crosswalk metric over all driving time. In some implementations, the metric can be determined for different road types separately, and larger roads with faster vehicles (for example, highways with light traffic) can be scaled such that they are weighted higher than smaller roads with slower vehicles (for example, residential neighborhoods).

Handling Image Data on Mobile Computing Systems

A challenge of smartphone-based image analytics may relate to handling the volume of data produced by cameras in a bandwidth and power efficient manner. Processing, transmitting, and storing this data can deplete the smartphone's battery, use precious network bandwidth, and also consume large volumes of storage on servers.

Methods are described herein for processing the image data 112 that can help alleviate these issues while still allowing the previously described methods to be executed in an energy and computationally efficient manner.

Rather than transmitting all image data 112 to the remote computing environment 110, the system 100 can process acceleration, speed, and position data on the local computing system 106, identify time ranges of interest, and transmit the sensor data 114 corresponding to the time ranges of interest to the remote computing environment 110. To further reduce bandwidth, local processing algorithms can be applied on the data (e.g., on the mobile phone) prior to transmitting to the remote computing environment 110. For example, if an objective is to identify traffic density, the system 100 can identify other vehicles using processors on the phone, and then transmit information related to the number of cars and proximity to each car (as identified by the processing on the phone) to the remote computing environment 110.

In some implementations, because processing algorithms can be computationally expensive, one approach to determining whether it is cheaper to process on the local computing system 106 or on the remote computing environment can be determined based on processing capabilities of the local computing system 106. For example, the system 100 can generate a profile indicating computation times for each of the local computing system 106 and the remote computing environment 110.

Figure 2:
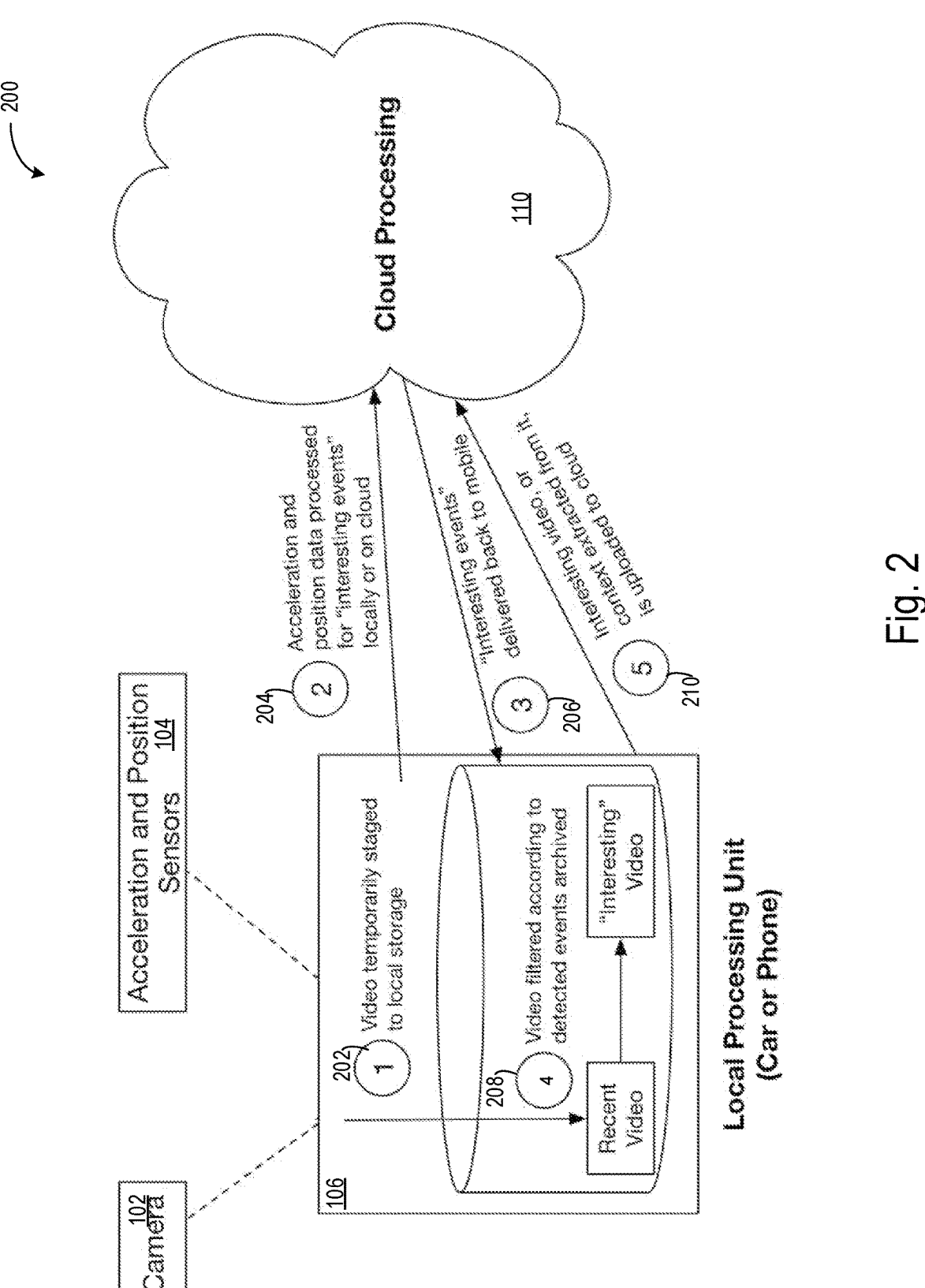
FIG. 2 shows a method for processing of data to contextually classify driver behavior.

Turning to FIG. 2, a method 200 for image processing of telematics data to contextually classify driver behavior is shown. The computing system 106 (for example, mobile phone) captures and stores (202) video data locally, either on the camera or on the device storage. In addition, the computing system 106 captures other telematics data, such as location, speed, acceleration, and rotation (gyro) data. The other data 104 is uploaded (204) to the remote computing environment 110 for processing, and a set of "interesting"

time periods, such as places where the user engaged in hard braking or excessive speeding are transmitted (206) back to the computing system 106.

The video from the interesting time periods is processed (208) locally, and either the results of that processing or the local data, or both, are transmitted (210) to the remote computing environment 110 for further processing. The determination of which type of processing that is applied locally depends on the specific analysis being done (e.g., which metric is being calculated as described above), as well as the capabilities of the phone.

Specifically, a method to select whether to apply processing locally at the local computing system 106 or remotely on the remote computing environment 110 works as follows. Suppose there is a set of video, D, which has cost (in dollars or energy) T(D) to transmit to the server from the phone. Further, suppose there is a cost P(D) to process this data with some local processing algorithm on the phone, producing a reduced dataset D', with a cost T(D') to transmit to the server from the phone. T(D) and P(D) can be estimated by transmitting/processing a small amount of data locally and observing OS-level metrics on energy consumption, for example. This method then chooses to process data locally and transmit D' when T(D)>T(D')+P(D), and otherwise sends D directly to the server for processing.

In some instances, the method 200 described previously with reference to FIG. 2 may miss some events of interest. For example, the method 200 can miss an event in which the vehicle 118 is accelerating through yellow lights that are not flagged as extreme acceleration events. For example, in some instances, a mobile phone does not to process every frame of video due to computational requirements, and therefore the mobile phone can prioritize video frames for processing.

To overcome this potential limitation, the computing system 106 is configured for run on-phone detection on a subset of video frames, even those that don't contain "interesting events" as in the method 200 described previously with reference to FIG. 2. Therefore, the system 100 can be configured to choose which subset of frames to apply detection algorithm.

Most objects & behaviors of interest in a driving situation, especially when there is not severe deceleration (for example, due to a crash), occur in the video for several seconds. For example, stop signs and stop lights can usually be visible for several seconds as a driver approaches them. Thus, it may not be necessary to analyze every frame of video (which may be captured at 30 fps or more), and instead the system 100 can be configured to process a frame every few seconds to determine whether the frame contains a stop sign or stop light.

In some cases, the sensor data 104 can provide context about where interesting events occur in the image data 112. For example, stop signs may generally not be located on highways, animals may not generally be present in urban environments, and drivers may generally decelerate when approaching a stop sign. This general knowledge can be used to generate weightings for frames or groups of frames included in the image data 112. The weightings can be used to prioritize image frames for processing.

For example, these observations can lead to an overall method that assigns a value to each frame based on whether other nearby frames have been analyzed, based on observed statistics about the frequency of different object types, or both. These values can be assigned up to a certain rate of frames per second to limit battery consumption, or only when the phone is powered (e.g., plugged into a power source).

The process of assigning such values can be described according to the following pseudocode:

```
When phone or processing device has sufficient power (e.g., is plugged
in):
  Let V = set of video frames, sampled at some regular interval, e.g.,
  once per second
  For each unprocessed frame f in V:
    Let E = Interesting Events around f (e.g., harsh braking,
    speeding, etc)
    Let C = Driving Context around f (e.g., freeway vs non-freeway,
    urban vs rural)
    Let H = Detector history around f (e.g., last ran detector K
    seconds ago)
    If (shouldProcess?(f, E, C, H))
      Let D = chooseDetector(f, E, C, H)
      Let fD = D(f) //run detector
      If (fD is not empty):
        Save fD as a detector
        Enqueue fD for transmission to server
    Mark f as processed
```

Hence, the choice of whether to process a frame can depend on the events at the time the frame was captured, the driving context (e.g., whether the vehicle 118 was traversing a freeway), as well as how long ago and what was detected the last time a frame was analyzed (for example, when the vehicle 118 is moving at slow speeds in a congested urban environment, it may not be beneficial to process new frames as frequently as when the vehicle 118 is moving at fast speeds in a rural environment). The choice of object detector to use can depend on this contextual information. For example, a different object detector may be used in urban vs. rural settings. This can be important because object detectors may take require a longer time to detect objects and can be slower when they need to be able to detect more or larger classes of objects.

FIG. 3 shows example image data 300. A forward-looking camera 102 captures street lights 306, street signs 304, and other vehicles 302 as features. As the vehicle 118 moves forward, subsequent frames of the image data 300 captured by the camera 102 show the other vehicles, roadway, street signs, etc. at updated positions in the frame. The position/velocity data gathered from the sensors 104 can be used to map features of the image data 300 from one frame to the next to make determinations of events of interest, as previously described. In some implementations, these features are extracted from the image data 300 using machine learning techniques, such as described later with reference to FIG. 4.

Figure 4:
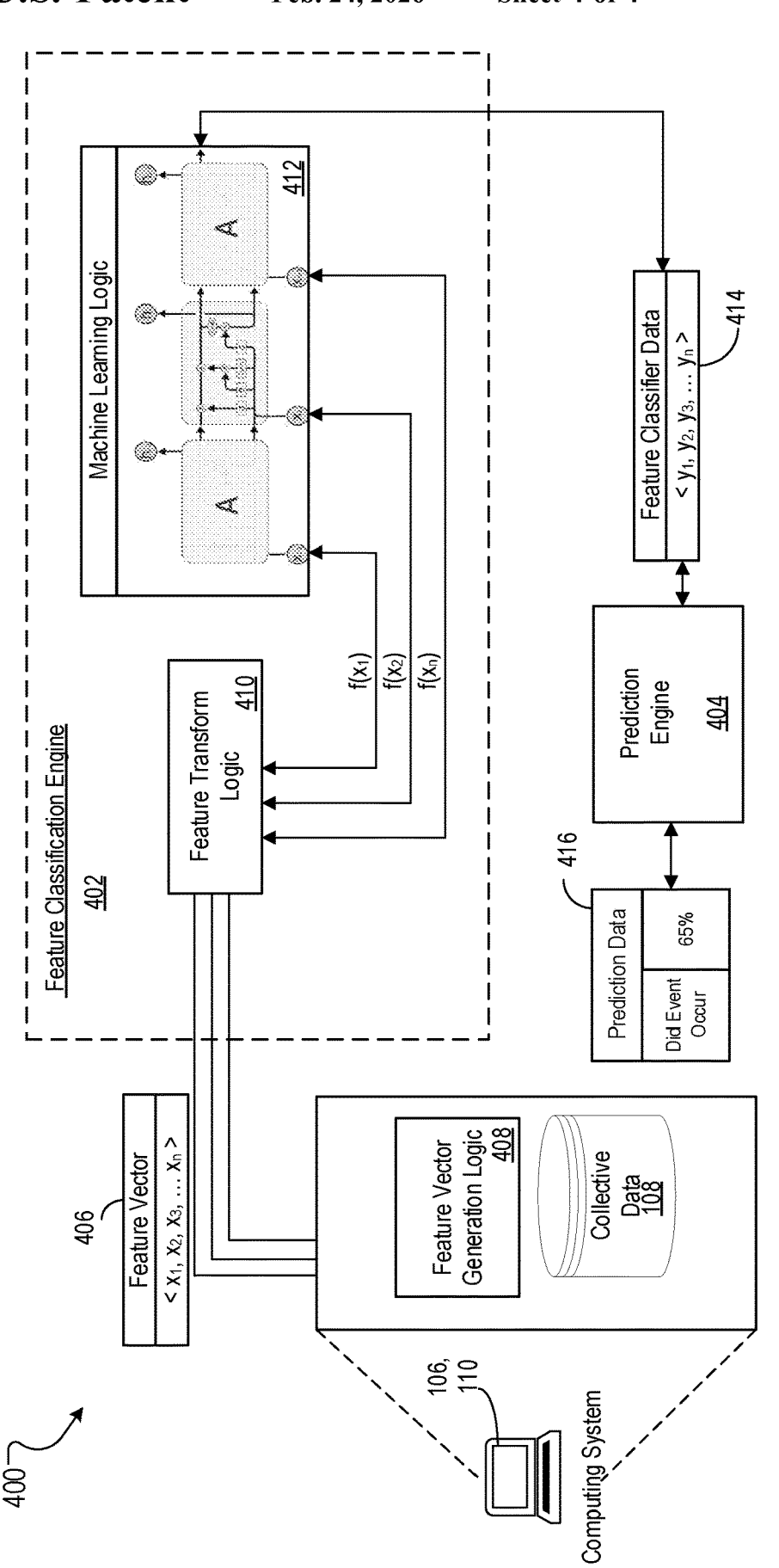
FIG. 4 shows an example of a data processing system for performing machine learning operations to detect events of interest.

FIG. 4 shows an example of a data processing system 400 for performing machine learning operations. In some implementations, the data processing system 400 can include one or both of the local computing device 106 and the remote computing environment 110. The data processing system 400 includes a feature classification engine 402 and a prediction engine 404. The feature classification engine 402 and the prediction engine 404 can be in communication with each other, with a client device 105, or both.

The risk events identified (as described previously) are represented by the features of a feature vector 406. The feature vector 406 concisely represents the characteristics of the captured data 112, 114, and can be processed by the data processing system 400, such as using a neural network or other machine learning techniques. The feature vector 406 is generated using feature vector logic 408. The feature vector logic 408 is capable of processing the data 112, 114 (that is, the collective data 108) that is captured by the camera 102 and sensors 104, and transforming the data 112, 114 into a formatted vector that represents features of the image data 112 and sensor data 114. These features can be useful for identifying events of interest. In an illustrative example, a detection of a group of red pixels of the image data 112 can be a feature that is used to determine whether a stop sign or red light is detected in an image frame. In another example, a vector of acceleration values can be used to identify hard braking events.

The feature vector 406 is sent from the client device to the feature classification engine 402 of the data processing system 400. The feature classification engine 402 include logic that transforms the feature vector 406 into feature classification data 414 that can be used to make predictions of events of interest for the driver by the prediction engine 404. The feature classification engine 402 includes a feature transform logic engine 410 and machine learning logic 412.

The feature transform logic 410 is capable of transforming the feature vector into inputs for the machine learning logic 412. For example, the feature transform logic 410 can normalize the features of the feature vector 406 to values that can be recognized by the machine learning logic 412, such as activation inputs for a neural network. In some implementations, the machine learning logic 412 is a support vector machine. In some implementations, the features of the feature vector 406 are transformed into values between 0 and 1 through a non-linear transformation, where the normalized value represents an activation level for the neural network, and where the normalized scale is a non-linear representation of the values of the features before the normalization process. The values to which the features are transformed can depend on a type of machine learning logic being used, and the weighting scheme associated with the machine learning logic.

The machine learning logic 412 (e.g., a neural network, support vector machine, etc.) is capable of receiving the normalized features of the feature vector 406 and computing classification data 414, such as through a deep learning process. For example, neural network logic can include a long short-term memory neural network, which tracks dependencies between features of the feature vector 406. Other recurrent neural networks can be used, as well as other machine learning classifiers.

The feature classifier data 414 includes classification metrics for one or more of the features of the feature vector 406 to values for known features interest, such as from a feature library. For example, the percentage classification can be computed for each feature. The prediction engine 404 can compare classification values of feature classifier data 414 to a threshold classification, and discard features with insufficient classification. Because features can have dependencies on one another, the classification metrics can be determined before features are discarded.

In some implementations, the classification metric values can be stored in a feature index. The index is capable of showing the classification values for each feature of the index. The prediction engine 404, using the classification values, is capable of generating prediction data 416 representing one or more prediction values for each event of interest. If a prediction value is above a predetermined threshold value, the prediction engine 404 can predict that the event of interest has occurred. For example, the predetermined threshold can be a prediction value above 50%. In some implementations, to reduce false positives or false negatives, the predetermined threshold can be a higher percentage or a lower percentage than 50%.

As used in this specification, the term "vehicle" is defined broadly to include, for example, any kind of ground conveyance such as a car, truck, bus, bicycle, motorcycle, or recreational vehicle, among others.

While, for illustrative purposes, a driver has been described in the context of a human driver, implementations are not so limited. For example, a driver can refer to an on-board computer (for example, autonomous driving), or a combination of a human driver and an on-board computer (for example, semi-autonomous driving).

Other implementations are within the scope and spirit of the description and claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" as used in this specification is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

Other implementations are within the scope of the following claims.

What is claimed is:

1. A data processing system, comprising:

one or more processors; and memory storing instructions executable by the one or more processors to:

electronically capture, from an image capture device, image or video data during a trip in a vehicle;

electronically receive, from a telematics device, telematics data captured by one or more sensors of the telematics device during the trip in the vehicle, the telematics data including position, speed, acceleration, or rotation data;

process the telematics data to detect a set of time periods, each time period of the set of time periods corresponding to a corresponding event of interest that occurred at the vehicle during the time period;

for each time period:

(i) electronically retrieve a subset of the image or video data captured by the image capture device during the trip, wherein the subset of the image or video data is generated prior to electronic retrieval using a local computing device associated with the image capture device and the telematics device, wherein the subset of the image or video data has a first data size less than a data size of the image or video captured by the image capture device during the trip and corresponds to the time period such that retrieving the subset of the image or video data captured by the image capture device during the time period via network communication by the data processing system with the local computing device reduces consumption of communication resources relative to retrieving the image or video data captured by the image capture device during the trip;

(ii) process the subset of the image or video data with one or more machine learning models to identify one or more objects within the subset of the image or video data;

(iii) determine, based at least partly on the identified one or more objects, a context of the corresponding event of interest; and (iv) based at least partly on the context and the telematics data captured during the time period, determine a classification for the corresponding event of interest; and transmit feedback to an operator of the vehicle to assist the operator in improving the operation of the vehicle, the feedback comprising an indication the determined classification.

2. The system of claim 1, the memory storing instructions executable by the one or more processors to determine, based at least partly on the context, that the corresponding event of interest comprises a relative speeding event, a following distance event, a traffic density event, a rolling event, a missed stop event, a turning behavior event, a hard stop event, an impaired visibility event, or a crosswalk behavior event.

3. The system of claim 1, wherein determining the classification comprises determining whether the operator is at fault during the corresponding event of interest.

4. The system of claim 1, wherein determining the context of the corresponding event of interest comprises:

deriving features from at least one of (i) the image or video data captured by the image capture device during the time period, or (ii) the telematics data captured during the time period; and processing the derived features with machine learning logic to determine the context of the corresponding event of interest.

5. The system of claim 1, wherein the one or more processors are part of a mobile device, the vehicle, or a remote computing environment.

6. A computer-implemented method, comprising:

capturing, from an image capture device, image or video data during a trip in a vehicle;

receiving, from a telematics device, telematics data captured by one or more sensors of the telematics device during the trip in the vehicle, the telematics data including position, speed, acceleration, or rotation data;

processing the telematics data to detect a set of time periods, each time period of the set of time periods corresponding to a corresponding event of interest that occurred at the vehicle during the time period;

for each time period:

(i) retrieving a subset of the image or video data captured by the image capture device during the trip, wherein the subset of the image or video data is generated prior to electronic retrieval using a local computing device associated with the image capture device and the telematics device, wherein the subset of the image or video data has a first data size less than a data size of the image or video captured by the image capture device during the trip and corresponds to the time period such that retrieving the subset of the image or video data captured by the image capture device during the time period via network communication with the local computing device reduces consumption of communication resources relative to retrieving the image or video data captured by the image capture device during the trip;

(ii) processing the subset of the image or video data with one or more machine learning models to identify one or more objects within the subset of the image or video data combining the image or video data captured during the time period and the telematics data captured during the time period to generate and electronically store collective data representing the corresponding event of interest;

(iii) determining, based at least partly on the identified one or more objects, a context of the corresponding event of interest; and (iv) based at least partly on the context and the telematics data captured during the time period, determining a classification for the corresponding event of interest; and transmitting feedback to an operator of the vehicle to assist the operator in improving the operation of the vehicle, the feedback comprising an indication the determined classification.

7. The method of claim 6, further comprising determining, based at least partly on the context, that the corresponding event of interest comprises a relative speeding event, a following distance event, a traffic density event, a rolling event, a missed stop event, a turning behavior event, a hard stop event, an impaired visibility event, or a crosswalk behavior event.

8. The method of claim 6, wherein determining the context of the corresponding event of interest comprises:

deriving features from at least one of (i) the image or video data captured by the image capture device during the time period, or (ii) the telematics data captured during the time period; and processing the derived features with machine learning logic to determine the context of the corresponding event of interest.

9. The method of claim 6, wherein the method is performed by a mobile device, the vehicle, or a remote computing environment.

10. A non-transitory computer-readable storage medium having instructions executable by one or more processors to cause the one or more processors to:

electronically capture, from an image capture device, image or video data during a trip in a vehicle;

electronically receive, from a telematics device, telematics data captured by one or more sensors of the telematics device during the trip in the vehicle, the telematics data including position, speed, acceleration, or rotation data;

process the telematics data to detect a set of time periods, each time period of the set of time periods corresponding to a corresponding event of interest that occurred at the vehicle during the time period;

for each time period:

(i) electronically retrieve a subset of the image or video data captured by the image capture device during the trip, wherein the subset of the image or video data is generated prior to electronic retrieval using a local computing device associated with the image capture device and the telematics device, wherein the subset of the image or video data has a first data size less than a data size of the image or video captured by the image capture device during the trip and corresponds to the time period such that retrieving the subset of the image or video data captured by the image capture device during the time period via network communication by with the local computing device reduces consumption of communication resources relative to retrieving the image or video data captured by the image capture device during the trip;

(ii) process the subset of the image or video data with one or more machine learning models to identify one or more objects within the subset of the image or video data;

(iii) determine, based at least partly on the identified one or more objects, a context of the corresponding event of interest; and (iv) based at least partly on the context and the telematics data captured during the time period, determine a classification for the corresponding event of interest; and transmit feedback to an operator of the vehicle to assist the operator in improving the operation of the vehicle, the feedback comprising an indication the determined classification.

11. The non-transitory computer-readable storage medium of claim 10 storing instructions executable by the one or more processors to determine, based at least partly on the context, that the corresponding event of interest comprises a relative speeding event, a following distance event, a traffic density event, a rolling event, a missed stop event, a turning behavior event, a hard stop event, an impaired visibility event, or a crosswalk behavior event.

12. The non-transitory computer-readable storage medium of claim 10, wherein determining the classification comprises determining whether the operator is at fault during the corresponding event of interest.

13. The non-transitory computer-readable storage medium of claim 10, wherein determining the context of the corresponding event of interest comprises:

deriving features from at least one of (i) the image or video data captured by the image capture device during the time period, or (ii) the telematics data captured during the time period; and processing the derived features with machine learning logic to determine the context of the corresponding event of interest.

14. The non-transitory computer-readable storage medium of claim 10, wherein the one or more processors are part of a mobile device, the vehicle, or a remote computing environment.

15. The system of claim 1, wherein the context for the corresponding event of interest comprises a speed of one or more other vehicles, a distance of one or more other vehicles, a traffic density, a turning context, a stopping context, a visibility at the vehicle, signage, a traffic signal, or a crosswalk.

16. The system of claim 1, wherein the operator of the vehicle comprises at least one of a human driver or an on-board computer.

17. The method of claim 6, further comprising providing the determined classification for setting an insurance premium for the operator of the vehicle.

18. The system of claim 1, wherein the classification determined based at least partly on the context and the telematics data captured during the time period is adjusted relative to a classification determined based on the telematics data captured during the time period.

19. The system of claim 1, wherein the memory stores instructions executable by the one or more processors to process pixels of the subset of the image or video data with the one or more machine learning models to identify the one or more objects within the subset of the image or video data.

* * * * *